(12) United States Patent
Senthivel et al.

(10) Patent No.: US 8,396,955 B2
(45) Date of Patent: Mar. 12, 2013

(54) SYSTEMS AND METHODS FOR DISCOVERY OF NETWORK TOPOLOGY USING SERVICE OAM

(75) Inventors: Kumaravel Senthivel, Murphy, TX (US); Calvin Wan, Plano, TX (US); Chandrasekaran Ganesh, Murphy, TX (US)

(73) Assignee: Fujitsu Limited, Kawasaki-shi (JP)

( * ) Notice: Subject to any disclaimer, the term of this patent is extended or adjusted under 35 U.S.C. 154(b) by 193 days.

(21) Appl. No.: 12/832,484

(22) Filed: Jul. 8, 2010

(65) Prior Publication Data

US 2012/0011206 A1 Jan. 12, 2012

(51) Int. Cl.
*G06F 15/173* (2006.01)
*G06F 11/00* (2006.01)

(52) U.S. Cl. ............... 709/223; 370/218; 370/241.1

(58) Field of Classification Search ....... 370/241–241.1, 370/389, 395.1–397, 395.53, 910, 218; 709/220–229, 238, 242
See application file for complete search history.

(56) References Cited

U.S. PATENT DOCUMENTS

| | | | | |
|---|---|---|---|---|
| 5,453,979 | A * | 9/1995 | Schibler et al. | 370/395.32 |
| 7,047,313 | B1 * | 5/2006 | Broerman | 709/238 |
| 7,085,224 | B1 * | 8/2006 | Oran | 370/216 |
| 7,382,731 | B1 * | 6/2008 | Zhao et al. | 370/236 |
| 7,437,354 | B2 * | 10/2008 | Venkatachary et al. | 1/1 |
| 7,644,317 | B1 * | 1/2010 | Sajassi et al. | 714/43 |
| 7,817,637 | B2 * | 10/2010 | Kitani et al. | 370/392 |
| 2004/0249803 | A1 * | 12/2004 | Vankatachary et al. | 707/3 |
| 2005/0132026 | A1 * | 6/2005 | Govil | 709/220 |
| 2008/0186965 | A1 * | 8/2008 | Zheng et al. | 370/389 |
| 2008/0259807 | A1 * | 10/2008 | Yan | 370/242 |
| 2009/0063666 | A1 * | 3/2009 | Scholz et al. | 709/222 |
| 2009/0161672 | A1 * | 6/2009 | Shimada | 370/389 |
| 2009/0201819 | A1 * | 8/2009 | Mizutani et al. | 370/241.1 |
| 2009/0232006 | A1 * | 9/2009 | Mohan et al. | 370/241.1 |
| 2009/0316602 | A1 * | 12/2009 | Nandy et al. | 370/254 |
| 2011/0167119 | A1 * | 7/2011 | Wan et al. | 709/206 |
| 2011/0280124 | A1 * | 11/2011 | Unger et al. | 370/230 |

* cited by examiner

*Primary Examiner* — Brendan Higa
(74) *Attorney, Agent, or Firm* — Baker Botts L.L.P.

(57) ABSTRACT

According to one embodiment, a method may include instantiating a first maintenance end point on a first port of a first network element. The first maintenance end point may determine whether a heartbeat message has been received from a second maintenance end point instantiated on a second port of a second network element. In response to determining that the heartbeat message has been received, the maintenance end point may analyze the heartbeat message to determine an identifier for the second network element and an identifier for the second port. Based on the determination of the identifier of the second network element and the identifier of the second port, the network element may store information to an adjacency list, the information indicating at least one of an adjacency of the first port to the second port and an adjacency of the first network element to the second network element.

18 Claims, 3 Drawing Sheets

SYSTEMS AND METHODS FOR DISCOVERY OF NETWORK TOPOLOGY USING SERVICE OAM

TECHNICAL FIELD

This invention relates generally to the field of communications systems and more specifically to discovery of a network topology.

BACKGROUND

In telecommunications, information is often sent, received, and processed according to the Open System Interconnection Reference Model (OSI Reference Model or OSI Model). In its most basic form, the OSI Model divides network architecture into seven layers which, from top to bottom, are the Application, Presentation, Session, Transport, Network, Data-Link, and Physical Layers, which are also known respectively as Layer 7 (L7), Layer 6 (L6), Layer 5 (L5), Layer 4 (L4), Layer 3 (L3), Layer 2 (L2), and Layer 1 (L1). It is therefore often referred to as the OSI Seven Layer Model.

Layer 2 is the layer which typically transfers data between adjacent network nodes in a wide area network or between nodes on the same local area network segment. Layer 2 provides the functional and procedural means to transfer data between network entities and might provide the means to detect and possibly correct errors that may occur in the Layer 1. Examples of Layer 2 protocols are Ethernet for local area networks (multi-node), the Point-to-Point Protocol (PPP), HDLC and ADCCP for point-to-point (dual-node) connections. Layer 2 data transfer may be handled by devices known as switches.

Layer 3 is responsible for end-to-end (source to destination) packet delivery including routing through intermediate hosts, whereas the Layer 2 is responsible for node-to-node (e.g., hop-to-hop) frame delivery on the same link. Perhaps the best known example of a Layer 3 protocol is Internet Protocol (IP). Layer 3 data transfer may be handled by devices known as routers.

A switch may forward network traffic based on contents of an L2 forwarding table resident upon the network element that associates unique identifiers (e.g., addresses such as MAC addresses) of other network elements coupled to the particular network element to egress interfaces of the particular network element. Thus, in order to determine the proper egress interface to which an ingress interface should forward traffic to be transmitted by the network element, logic of the network element may examine the traffic to determine a destination address for the traffic, and then perform a lookup in the forwarding table to determine the egress interface associated with such destination address.

Such L2 forwarding table may be created based on the network topology of network elements in a network. Such network topology may include a table setting forth the L2 connectivity of various network elements in a network. Traditionally, such network topologies cannot be constructed through the use of strictly L2 protocols, and often require L3 protocols (e.g., link management protocol) in to assist in construction of the L2 network topology.

SUMMARY OF THE DISCLOSURE

In accordance with the present invention, disadvantages and problems associated with discovery of network topology may be reduced or eliminated.

According to one embodiment, a method may include instantiating a first maintenance end point on a first port of a first network element. The first maintenance end point may determine whether a heartbeat message has been received from a second maintenance end point instantiated on a second port of a second network element. In response to determining that the heartbeat message has been received, the maintenance end point may analyze the heartbeat message to determine an identifier for the second network element and an identifier for the second port. Based on the determination of the identifier of the second network element and the identifier of the second port, the network element may store information to an adjacency list, the information indicating at least one of an adjacency of the first port to the second port and an adjacency of the first network element to the second network element.

Certain embodiments of the invention may provide one or more technical advantages. A technical advantage is that Layer 2 messaging can be used for neighbor discovery and topology mapping, without the need for Layer 3 protocols.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
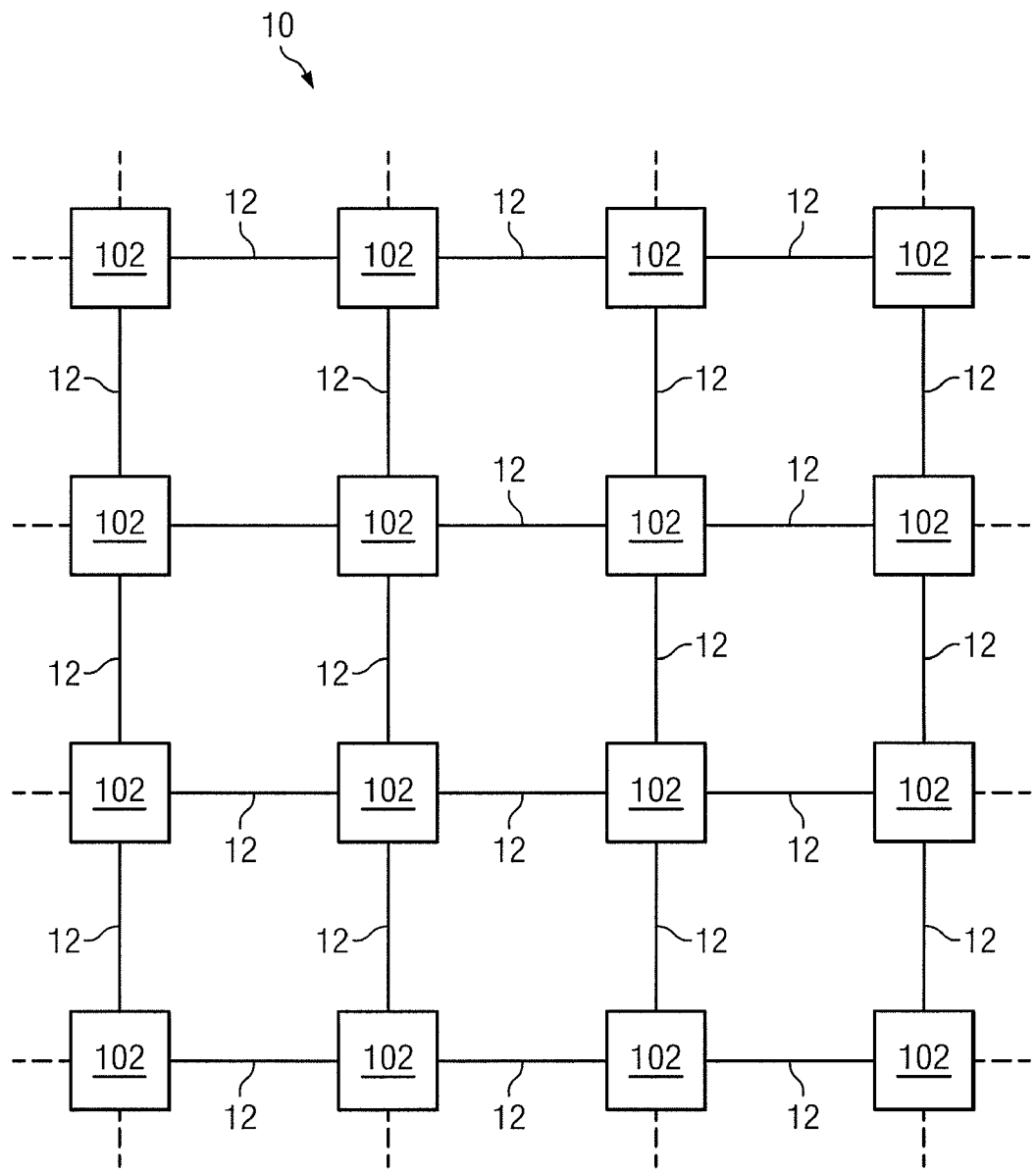
FIG. 1 illustrates a block diagram of an example network, in accordance with certain embodiments of the present disclosure.
Figure 2:
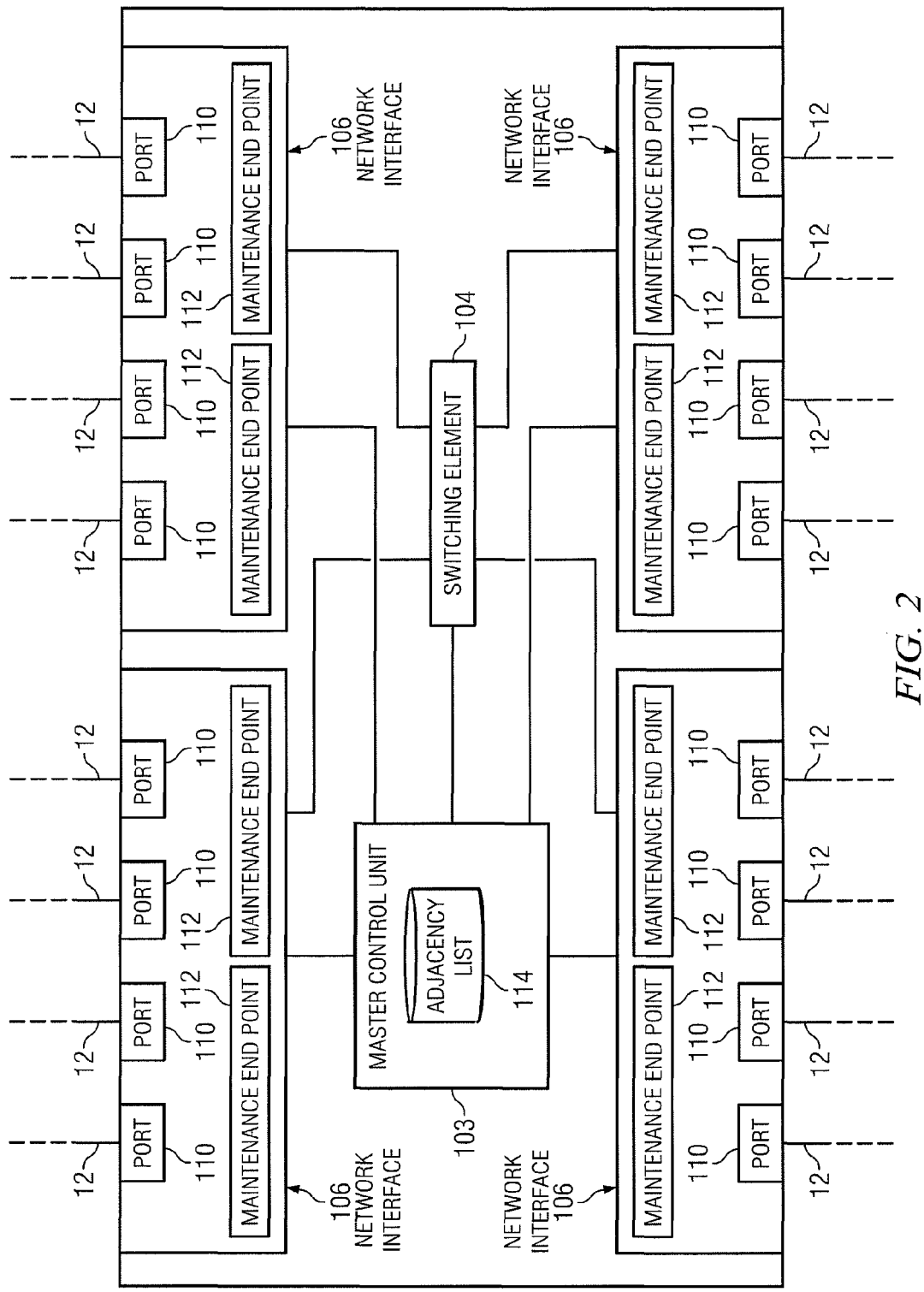
FIG. 2 illustrates a block diagram an example network element, in accordance with certain embodiments of the present disclosure.
Figure 3:
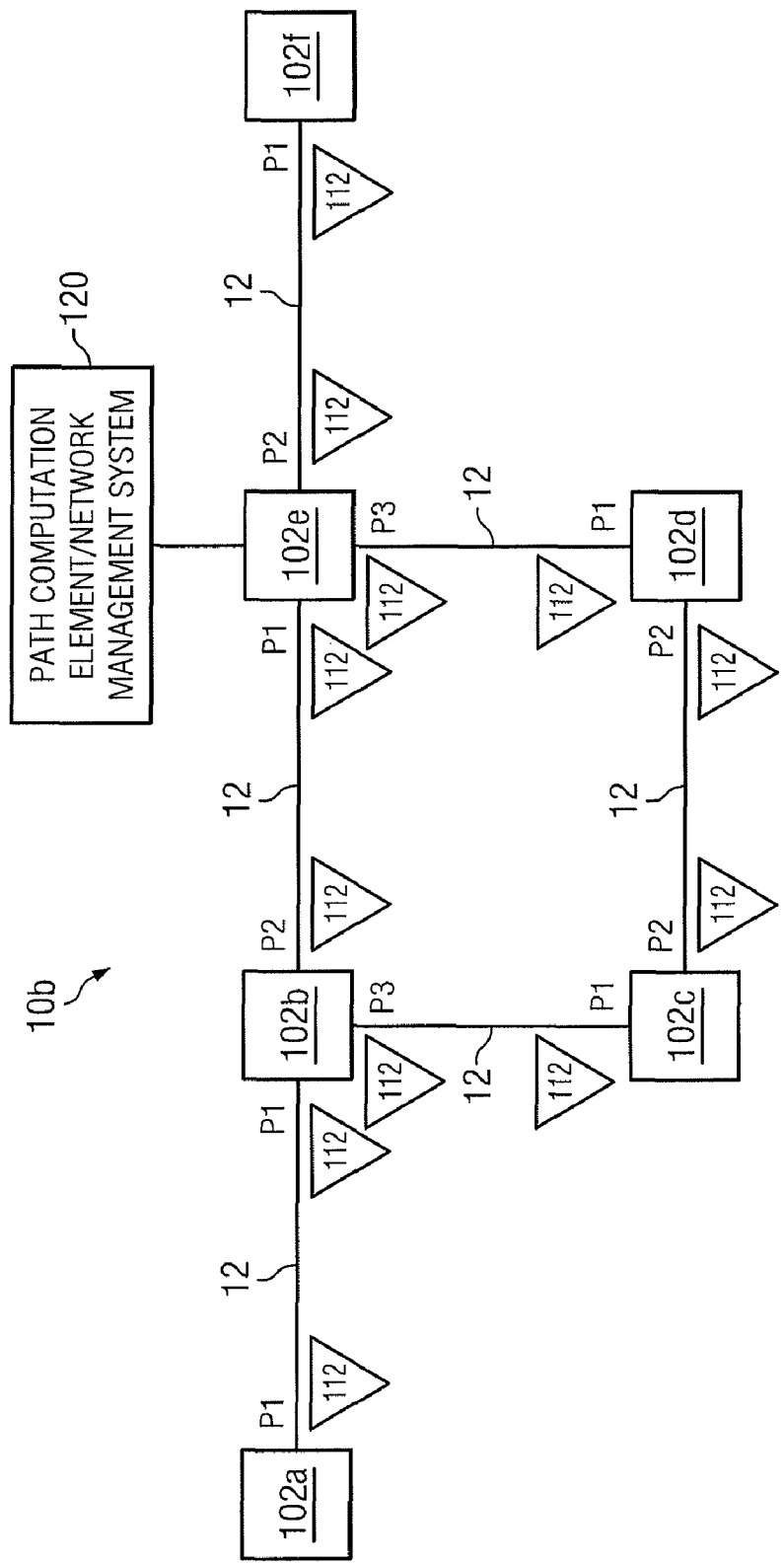
FIG. 3 illustrates a block diagram of an example network for which network topology may be discovered using SOAM, in accordance with certain embodiments of the present disclosure.

Embodiments of the present invention and its advantages are best understood by referring to FIGS. 1-3, like numerals being used for like and corresponding parts of the various drawings.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include a master control unit 103, a switching element 104, and one or more network interfaces 106 communicatively coupled to each of master control unit 103 and switching element 104.

Master control unit 103 may include any suitable system, apparatus, or device configured to manage network element 102, including management of routing of data between ports 110. Master control unit 103 may maintain a routing table in accordance with open shortest path first (OSPF) protocol, intermediate system-intermediate system (ISIS) protocol, or any other suitable protocol, wherein such routing table may include any table, database, file, or other data structure configured to maintain information relating a particular ingress port 110 to a corresponding egress port 110.

As shown in FIG. 2, master control unit 103 may include adjacency list 114. Adjacency list 114 may be stored in memory and/or other computer readable media, and may include a file, map, list, database, table, or other suitable data structure configured to store adjacency information regarding each network element 102 to which the network element 102 may be adjacent. Adjacency list 114 may be created and/or maintained based on data present in heartbeat messages (e.g., continuity check messages) received from adjacent network elements 102, as described in greater detail below.

Although adjacency list 114 is depicted in FIG. 2 as being an integral component of master control unit 103, other embodiments may exist in which adjacency list 114 resides outside of master control unit 103, including switching element 104 and/or one or more of network interfaces 106.

Switching element 104 may be communicatively coupled to master control unit 103 and may include any suitable system, apparatus, or device configured to receive traffic via a port 110 and route such traffic to a particular network interface 106 and/or port 110 based on analyzing the contents of the data and/or based on a characteristic of a signal carrying the data (e.g., a wavelength and/or modulation of the signal). For example, in certain embodiments, a switching element 104 may include a switch fabric (SWF).

Each network interface 106 may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

Also as shown in FIG. 2, each network interface 106 may have one or more maintenance end points 112 provisioned thereon. A maintenance end point 112 may include an end point of a group of network components associated with a particular maintenance level and may be configured to communicate management traffic, such as heartbeat or hello messages, for example. In certain embodiments, a maintenance end point 112 may include a Maintenance Entity Group End Point (MEP) in accordance with a Service Operation, Administration, and Management standard.

Service Operation, Administration, and Management ("Service OAM" or "SOAM"), is defined by IEEE 802.1ag and defines Maintenance Entity Groups (MEGs) and MEG End Points (MEPs) that may reside on a network element 102. SOAM is often used to diagnose and monitor an Ethernet service after the service has been instantiated between network elements 102. Two or more MEPs may be configured on network elements 102 along a service path. A MEG may be associated with each service and includes two or more MEPs also associated with the service. Each MEG may be assigned a service level (e.g., 0 to 7). For example, briefly turning to FIG. 3, network elements 102a and 102f may have peer MEPs instantiated thereon at Level 5, while network elements 102b and 102e may have peer MEPs instantiated thereon at level 3. In such example, network elements 102a and 102f would communicate CCMs between each other, and network elements 102b and 102e would communicate CCMs between each other. In accordance with SOAM, heartbeat messages known as continuity check messages (CCMs) are used to monitor a service. CCMs are periodically communicated between MEPs. A service is considered down if a MEP does not receive a CCM from its peer MEP within a certain time.

In the present disclosure, to enable SOAM to be used to discover network topology, a MEP may be instantiated for each port 110 of a network element 102, with a peer MEP instantiated on a corresponding port of an adjacent network element 102. In certain embodiments, such MEPs may be Level 0 MEPs. FIG. 3 illustrates a block diagram of an example network 10b for which network topology may be discovered using such MEP-per-port approach, in accordance with certain embodiments of the present disclosure.

As shown in FIG. 3, each port 110 (ports 110 for each network element 102 are labeled as P1, P2, P3, etc. in FIG. 3) has instantiated thereon a maintenance end point 112 (e.g., a MEP). Each maintenance end point 112 instantiated on a particular port 110 may be associated with a peer maintenance end point 112 instantiated on another port 110 adjacent to and coupled to the particular port 110. For example, maintenance end point 112 instantiated on port P3 of network element 102b may be associated with maintenance end point 112 instantiated on port P1 of network element 102c.

In operation, CCMs may be exchanged by such maintenance end points 112. A CCM may include a multicast address as its destination address, and may include a logical MAC address of the network element 102 originating the CCM as the source address. A port number for the port 110 on which the maintenance end point 112 originating the CCM resides may also be included in an organization-specific type-length-value (TLV) element of the CCM. Thus, a maintenance end point 112 receiving a CCM may determine an adjacent network element 102's logical MAC address and the port number of the adjacent network element 102 that is coupled to the port 110 on which the receiving maintenance end point 112 resides. Each maintenance end point 112 may cause this information to be stored in the adjacency list 114 for its associated network element 102 (e.g., by communicating such information to its master control unit 103).

Accordingly, each network element's adjacency list 114 may include information regarding the port connectivity of such network element 102 to other network elements 102. For example, Table 1 illustrates an example adjacency list 114 for each network element 102 of network 10b.

TABLE 1

| Network Element | Adjacency Lists 114 |
| --- | --- |
| 102a | 102a,P1→102b,P1 |
| 102b | 102b,P1→102a,P1 & 102b,P2→102e,P1 & 102b,P3→102c,P1 |
| 102c | 102c,P1→102b,P3 & 102c,P2→102d,P2 |
| 102d | 102d,P1→102e,P3 & 102d,P2→102c,P2 |
| 102e | 102e,P1→102b,P2 & 102e,P2→102f,P1 → 102e,P3 → 102d,P1 |
| 102f | 102f,P1→102e,P2 |

Each network element 102 may communicate the individual adjacency lists 114 to path computation element/network management system 120 via a management plane as management traffic. Path computation element/network management system 120 may, based on such adjacency lists 114, construct a network topology for network 10b. In some embodiments, path computation element/network management system 120 may communicate such topology information back to individual network elements 102. Although path computation element/network management system 120 is shown as being coupled to a particular network element 102, path computation element/network management system 120 may be coupled to any one or more of network elements 102.

In addition, because CCMs are communicated at regular intervals, maintenance end points 112 may regularly update adjacency lists 114 and, as a consequence, path computation element/network management system 120 may regularly update the network topology.

A component of network 10 or 10b may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 or 10b without departing from the scope of the invention. The components of network 10 or 10b may be integrated or separated. Moreover, the operations of network 10 or 10b may be performed by more, fewer, or other components. Additionally, operations of network 10 or 10b may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    instantiating a first maintenance end point on a first port of a first network element;
    determining, by the first maintenance end point, whether a heartbeat message has been received from a second maintenance end point instantiated on a second port of a second network element;
    in response to determining that the heartbeat message has been received, analyzing the heartbeat message to determine an identifier for the second network element and an identifier for the second port; and
    based on the determination of the identifier of the second network element and the identifier of the second port, storing information to an adjacency list, the information indicating at least one of:
        adjacency of the first port to the second port; and
        adjacency of the first network element to the second network element; and
    communicating the adjacency list to a path computation element configured to determine a network topology including the first network element, the second network element, and a plurality of other network elements based on the adjacency list and a plurality of other adjacency lists.

2. A method according to claim 1, further comprising, in response to determining that the heartbeat message was not received within a predetermined interval, modifying the adjacency list to indicate that the first network element and the second network element are not adjacent.

3. A method according to claim 1, wherein the heartbeat message comprises a continuity check message.

4. A method according to claim 1, wherein the identifier of the second network element is a logical media access control address associated with the second network element.

5. A method according to claim 1, wherein the identifier of the second port is a port number associated with the second port.

6. A method according to claim 1, wherein the first maintenance end point is a maintenance entity group end point.

7. A method according to claim 6, wherein the maintenance entity group end point is a Level 0 maintenance entity group end point.

8. A method according to claim 1, wherein:
a second maintenance end point is instantiated on the second port;
the second maintenance end point is a peer to the first maintenance end point.

9. A method comprising:
instantiating a first maintenance end point on a first port of a first network element; and
communicating a heartbeat message from the first maintenance end point to a second maintenance end point instantiated on a second port of a second network element adjacent to the first network element, the heartbeat message including an identifier for the first network element and the first port.

10. A method according to claim 9, wherein the heartbeat message comprises a continuity check message.

11. A method according to claim 9, wherein the identifier of the first network element is a logical media access control address associated with the first network element.

12. A method according to claim 9, wherein the identifier of the first port is a port number associated with the first port.

13. A method according to claim 9, wherein the first maintenance end point is a maintenance entity group end point.

14. A method according to claim 13, wherein the maintenance entity group end point is a Level 0 maintenance entity group end point.

15. A method according to claim 9, wherein:
a second maintenance end point is instantiated on the second port;
the second maintenance end point is a peer to the first maintenance end point.

16. A network element comprising:
a non-transitory computer-readable medium; and
a network interface communicatively coupled to the non-transitory computer-readable medium, the network interface having a port with a maintenance end point provisioned thereon, the maintenance end point configured to:
determine whether a heartbeat message has been received from a second maintenance end point instantiated on a second port of a second network element;
in response to determining that the heartbeat message has been received, analyze the heartbeat message to determine an identifier for the second network element and an identifier for the second port;
based on the determination of the identifier of the second network element and the identifier of the second port, store an adjacency list to the non-transitory computer-readable medium, the information indicating at least one of:
adjacency of the port to the second port; and
adjacency of the network element to the second network element; and
communicate the adjacency list to a path computation element configured to determine a network topology including the network element, the second network element, and a plurality of other network elements based on the adjacency list and a plurality of other adjacency lists.

17. A network element according to claim 16, the maintenance end point further configured to, in response to determining that the heartbeat message was not received within a predetermined interval, modify the adjacency list to indicate that the first network element and the second network element are not adjacent.

18. A network element according to claim 16, wherein the heartbeat message comprises a continuity check message.

* * * * *